United States Patent [19]

Shiho

[11] Patent Number: 5,557,588
[45] Date of Patent: Sep. 17, 1996

[54] MAGNETOOPTICAL RECORDING/REPRODUCING APPARATUS WITH BIAS MAGNETIC FIELD GENERATION DEVICES FOR MAGNETIC MODULATION RECORDING AND OPTICAL MODULATION RECORDING

[75] Inventor: Makoto Shiho, Yokohama, Japan

[73] Assignee: Canon Kabushiki Kaisha, Tokyo, Japan

[21] Appl. No.: 251,959

[22] Filed: Jun. 1, 1994

[30] Foreign Application Priority Data

Jun. 3, 1993 [JP] Japan .................................... 5-156406
Jun. 3, 1993 [JP] Japan .................................... 5-156407

[51] Int. Cl.⁶ ........................... G11B 13/04; G11B 11/12
[52] U.S. Cl. ............................ 369/13; 360/114; 360/59
[58] Field of Search ............................. 369/13, 14, 261, 369/270, 271, 194, 75.2, 44.14; 360/103, 104, 114, 59, 66, 60, 137; 365/122

[56] References Cited

U.S. PATENT DOCUMENTS

| | | | |
|---|---|---|---|
| 4,993,009 | 2/1991 | Shiho | 369/13 |
| 5,202,863 | 4/1993 | Miyatake et al. | 369/13 |
| 5,253,232 | 10/1993 | Akagi et al. | 369/13 |
| 5,434,831 | 7/1995 | Ishii et al. | 369/13 |

FOREIGN PATENT DOCUMENTS 0524839  1/1993  European Pat. Off. .

OTHER PUBLICATIONS

Patent Abstracts of Japan, Kokai No. 6–76408, vol. 18, No. 330, Jun. 1994.
Patent Abstracts of Japan, Kokai No. 5–225642, vol. 17, No. 681, Dec. 1993.
Patent Abstracts of Japan, Kokai No. 4–21945, vol. 16, No. 182, Apr. 1992.

*Primary Examiner*—Ali Neyzari
*Attorney, Agent, or Firm*—Fitzpatrick, Cella, Harper & Scinto

[57] ABSTRACT

In a magnetooptical recording/reproducing apparatus, a beam spot is formed on a recording medium by radiating a laser beam from an optical head to the recording medium. In magnetic field modulation recording, a bias magnetic field is applied from a first bias magnetic field generation device onto a very small region where the beam spot is formed. In optical modulation recording, bias magnetic field is applied from a second bias magnetic field generation device to the very small region. The first bias magnetic field generation device is adapted to be evacuated from a position above the very small region by an evacuating mechanism. The second bias magnetic field generation device is adapted to be moved to the position above the very small region to be mechanically interlocked with the evacuating mechanism.

4 Claims, 14 Drawing Sheets

MAGNETOOPTICAL RECORDING/REPRODUCING APPARATUS WITH BIAS MAGNETIC FIELD GENERATION DEVICES FOR MAGNETIC MODULATION RECORDING AND OPTICAL MODULATION RECORDING

BACKGROUND OF THE INVENTION

1. Field of the Invention

The present invention relates to a magnetooptical recording/reproducing apparatus provided with first and second bias magnetic field generation devices, wherein a laser beam is irradiated to a recording medium from an optical head movable with respect to the recording medium to form a light spot on the recording medium, and the first and second bias magnetic field generation devices are properly used according to plural modulation schemes to effect recording of information by applying a magnetic field to a very small region on which the light spot is formed.

2. Related Background Art

As one conventional magnetooptical disk apparatus for performing magnetooptical recording/reproduction, an apparatus, which performs recording based on a so-called optical modulation method, i.e., applies a predetermined magnetic field from a bias magnetic field generation device to a recording region of a magnetooptical recording medium, and radiates a laser beam modulated according to recording information from an optical head to the recording region, is known. As another apparatus, an apparatus, which performs recording based on a magnetic field modulation method, i.e., radiates a constant laser beam from an optical head to a recording region, and applies a magnetic field modulated according to recording information from a bias magnetic field generation device to the recording region, is known. Thus, a demand has arisen for a magnetooptical disk apparatus which has compatibility allowing recording/reproduction of information on both magnetooptical recording media of these different methods.

For this purpose, conventionally, as shown in FIGS. 1 to 4, a magnetooptical disk apparatus which has a structure using two different bias magnetic field generation devices has been proposed. In this case, a bias magnetic field generation device A used for recording in the magnetic field modulation method is arranged as a first bias magnetic field generation device, and a bias magnetic field generation device B used for recording in the optical modulation method is arranged as a second bias magnetic field generation device.

As is well known, in the bias magnetic field generation device A, a floating slider 2 which mounts a magnetic head as a bias magnetic field generation unit is supported by a support member 2b via a support spring 2a as a load beam, and the support member 2b is pivotally supported, via a pivot shaft 12, on a carriage 10 which carries an optical system. A torsion coil spring (not shown) is arranged around the pivot shaft 12 so as to bias the floating slider 2 against a magnetooptical disk 40. The carriage 10 is movable in the radial direction (X direction in FIG. 2) of the disk along guide rails 8. The two ends of each of the guide rails 8 are fixed to a base 9.

The magnetooptical disk 40 contained in a disk cassette 30 is rotatably placed on a spindle motor 80. The spindle motor 80 is supported by an apparatus main body to be movable in the vertical direction (Y direction in FIG. 2). When the disk cassette 30 is not loaded in the apparatus main body, the spindle motor 80 is retracted to a lower portion to avoid interference with the disk cassette 30 to be inserted into the apparatus main body. When the disk cassette 30 is completely inserted into the apparatus main body, the spindle motor 80 is moved upward by a spindle motor lift mechanism (not shown), and clamps the magnetooptical disk 40.

Figure 1:
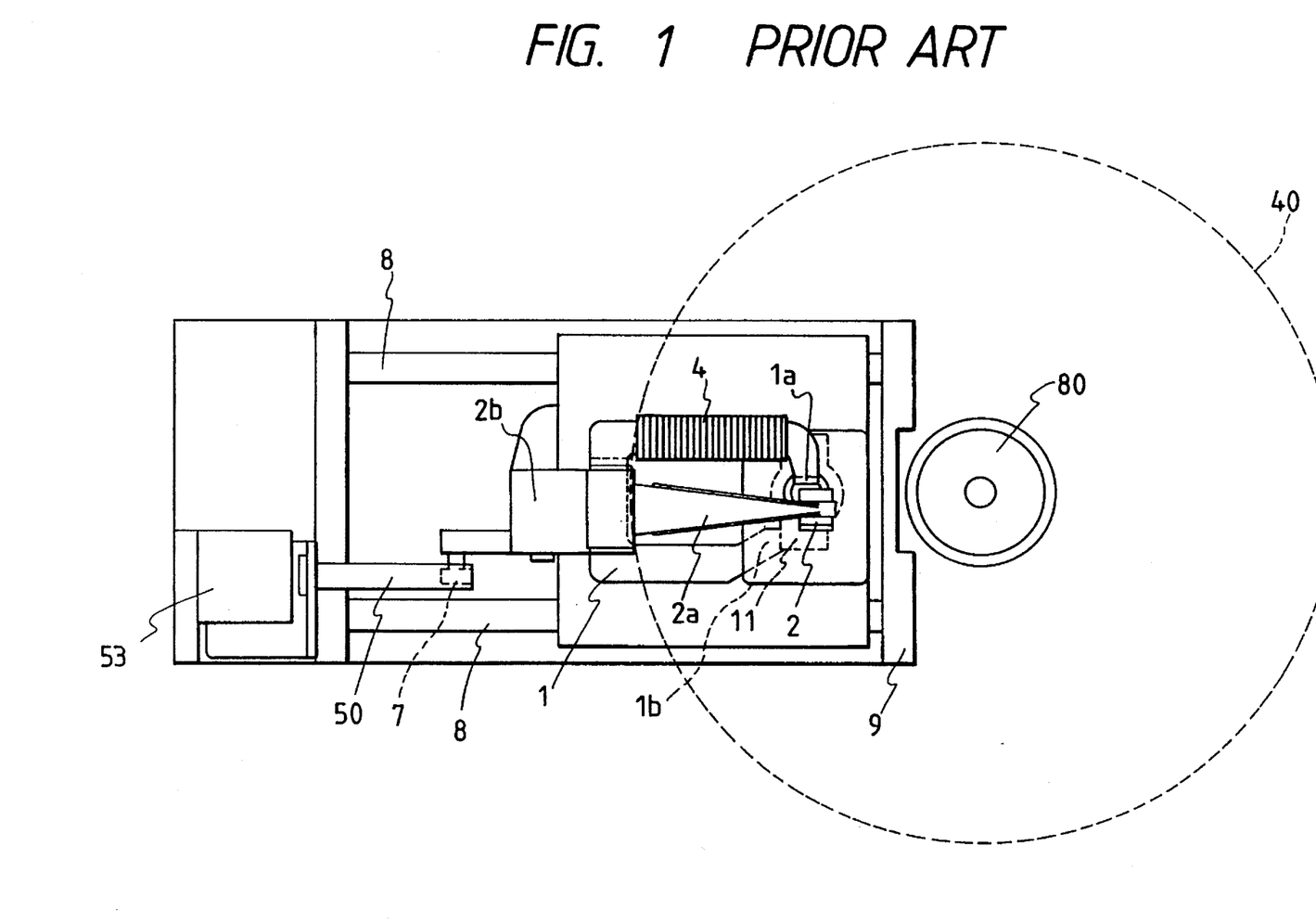
FIG. 1 is a plan view of a conventional magnetooptical disk apparatus.
Figure 2:
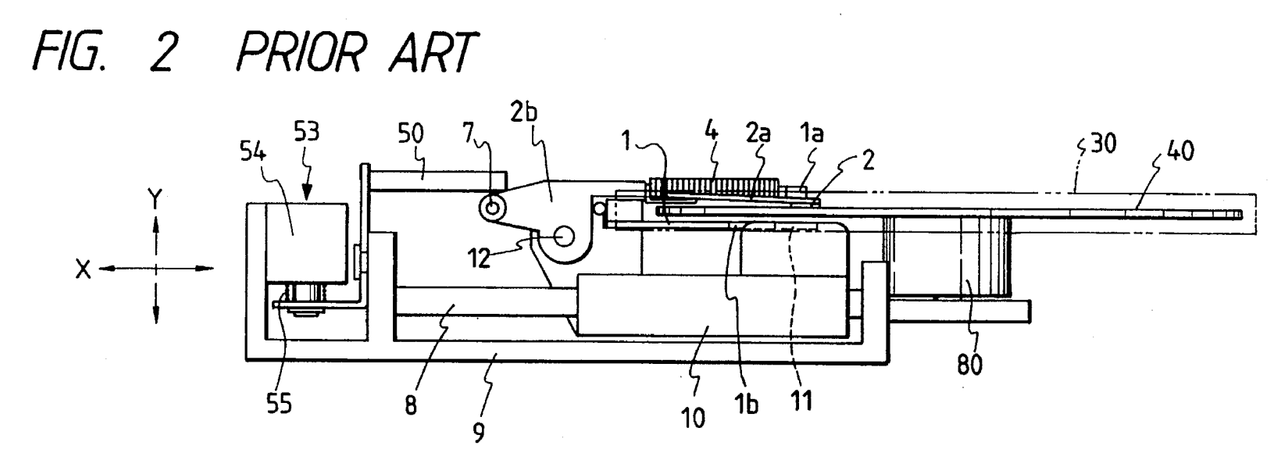
FIG. 2 is a side view of the conventional magnetooptical disk apparatus.
Figure 3:
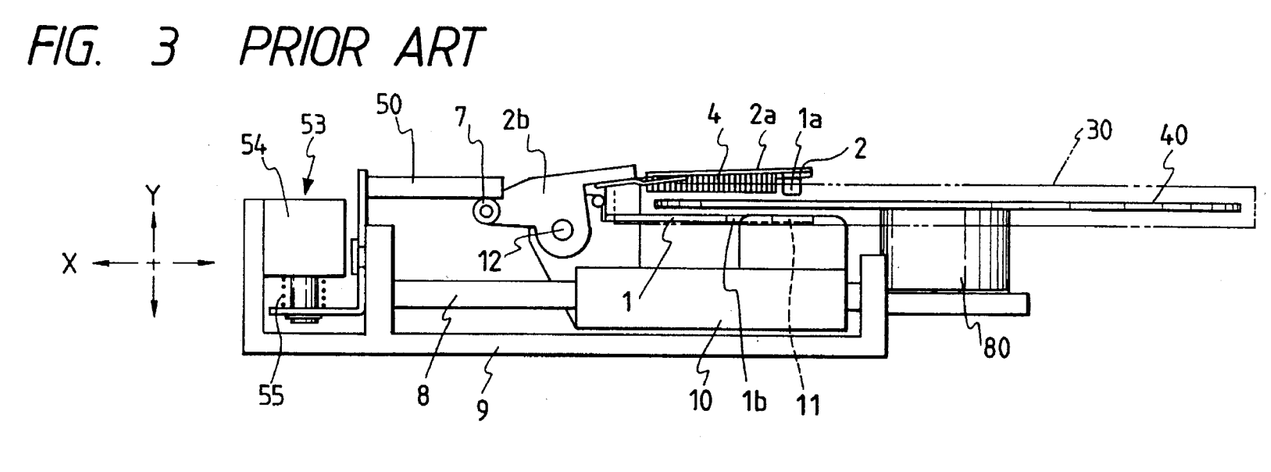
FIG. 3 is a side view of the conventional magnetooptical disk apparatus.

Upon insertion of the disk cassette 30 into the apparatus main body, the magnetic head of the bias magnetic field generation device A must also be retracted. For this purpose, the base 9 is provided with a solenoid driving mechanism 53 having a retracting lever 50 as a flip-up mechanism. When a solenoid 54 is not energized, as shown in FIG. 3, the retracting lever 50 is pulled down by the restoring force of a compression spring 55 to push down a roll-shaped engaging contact portion 7 provided at the rear end of the support member 2b, thereby retracting the magnetic head. When the solenoid 54 is energized, as shown in FIG. 2, since the retracting lever 50 is pulled up, the retracting lever 50 does not contact the engaging contact portion 7, and the floating slider 2 which mounts the magnetic head lands on the disk surface.

The bias magnetic field generation device B is constituted by a coil 4 provided to the carriage 10, and a substantially U-shaped core member 1. Two end portions 1a and 1b of the core member 1 are located on the two sides of the magnetooptical disk 40 to sandwich it therebetween.

Figure 4:
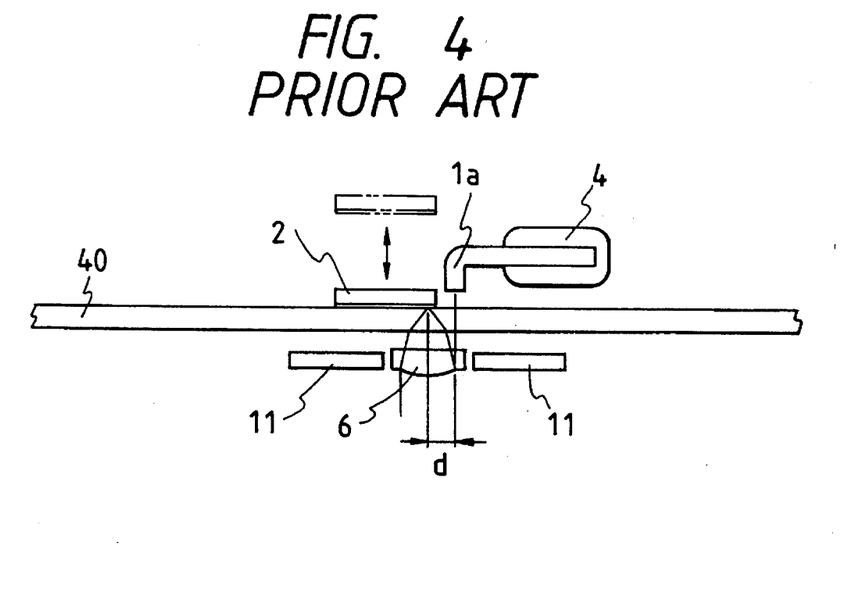
FIG. 4 is an enlarged sectional view of a portion, near a very small region where a beam spot is formed, of the conventional magnetooptical disk apparatus.

FIG. 4 is an enlarged sectional view of a portion near the above-mentioned very small region where the beam spot is formed. Referring to FIG. 4, an objective lens 6 focuses a light beam onto the very small region. An upper yoke 11 is arranged on an upper portion of a driving magnetic circuit (not shown) for the objective lens 6, and is used for preventing a magnetic field from leading the driving magnetic circuit to the very small region. When the end portion 1b of the core member 1 is located near the upper yoke 11, the upper yoke 11 also serves as a portion of a magnetic circuit of the bias magnetic field generation device B.

When the magnetooptical disk 40 is loaded into the apparatus main body, information on a control track of the magnetooptical disk 40 is reproduced to discriminate whether the loaded disk is one for magnetic field modulation recording or for optical modulation recording. If the loaded disk is a magnetic field modulation recording disk, energization to the solenoid 54 is started to bring down the floating slider 2 which mounts the magnetic head onto the disk. If the loaded disk is an optical modulation recording disk, the solenoid 54 is not energized, and the bias magnetic field generation device B is used.

However, in such a magnetooptical disk apparatus, as shown in FIG. 4, the end portion 1a of the core member 1 of the bias magnetic field generation device B must be inevitably arranged at a position offset by a distance d from the very small region where the beam spot is formed, so as to avoid interference with the floating slider 2 of the bias magnetic field generation device A.

Figure 5:
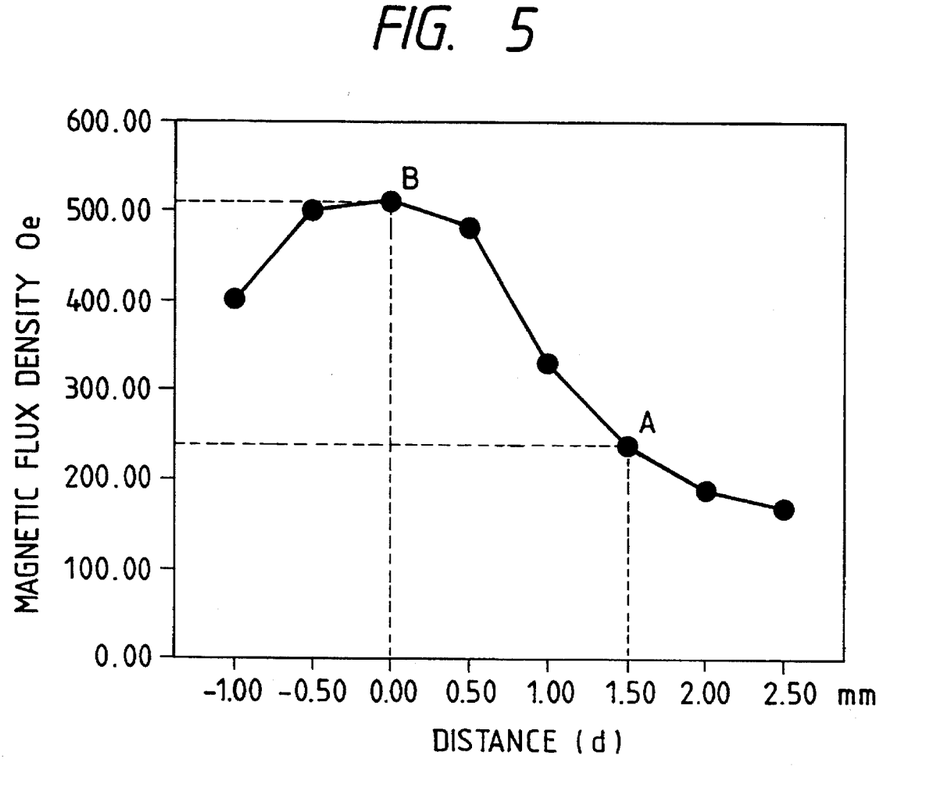
FIG. 5 is a graph showing a change in magnetic flux density in the very small region where the beam spot is formed when a distance d in FIG. 4 is changed.

In general, such an electromagnet has the highest magnetic flux density at a position right below the core end portion. FIG. 5 is a graph showing a change in magnetic flux density on the very small region where the beam spot is formed when the distance d is changed. At a point A, the generated magnetic flux density assumes a maximum value in the conventional arrangement. A point B is a point where d=0, i.e., corresponds to a case wherein the core end portion of the electromagnet is arranged right above the very small region. As can be seen from this graph, efficiency is very low since the conventional arrangement can use only magnetic field generation performance ½ that of the bias magnetic field generation device B. Therefore, the low efficiency has been compensated for by constituting a U-shaped core, increasing the number of turns of the coil, and increasing the sectional area of the core. However, these countermeasures undesirably increase the weight of the bias magnetic field generation device B, and make the optical head heavy, resulting in a slow seek operation.

SUMMARY OF THE INVENTION

The present invention has been made in consideration of the above situation, and has as its object to shorten the seek time by realizing a lightweight optical head by enhancing the efficiency of a bias magnetic field generation device in a magnetooptical recording/reproduction apparatus which includes first and second bias magnetic field generation devices used for recording information by different modulation methods.

In order to achieve the above object, there is provided a magnetooptical recording/reproduction apparatus, in which a beam spot is formed on a recording medium by radiating a laser beam from an optical head to the recording medium, and which includes first bias magnetic field generation means for applying a magnetic field modulation recording bias field onto a very small region where the beam spot is formed, and second bias magnetic field generation means for applying an optical modulation recording bias magnetic field onto the very small region, comprising:

evacuating means for evacuating the first bias magnetic field generation means from a position above the very small region; and moving means for moving the second bias magnetic field generation means to the position above the very small region to be mechanically interlocked with the evacuating means.

DETAILED DESCRIPTION OF THE PREFERRED EMBODIMENTS

The preferred embodiments of the present invention will be described below with reference to the accompanying drawings. Note that the same reference numerals as in the prior art denote the same parts throughout the drawings showing the embodiments of the present invention.

Figure 6:
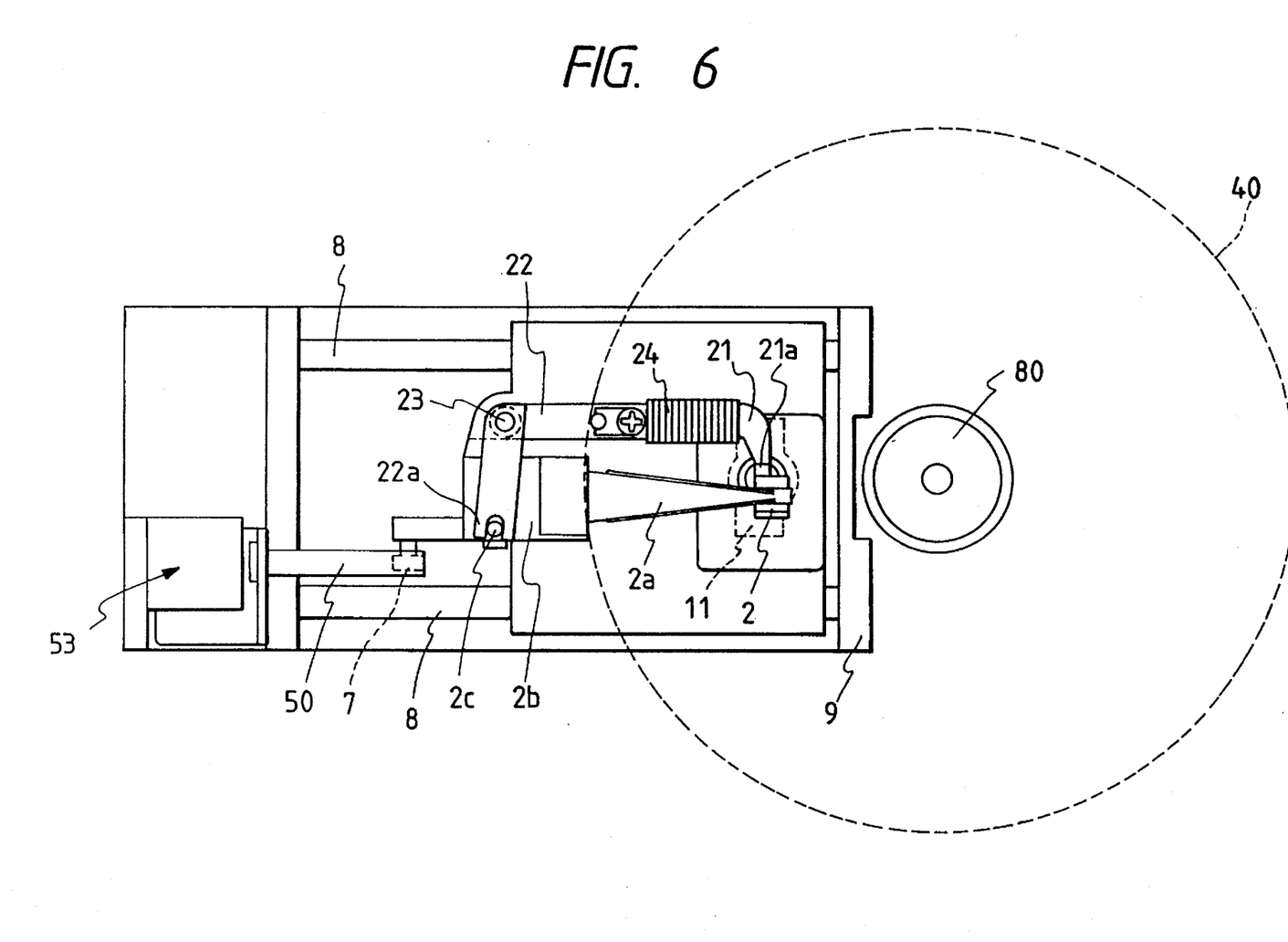
FIG. 6 is a plan view of a magnetooptical disk apparatus according to an embodiment of the present invention.
Figure 7:
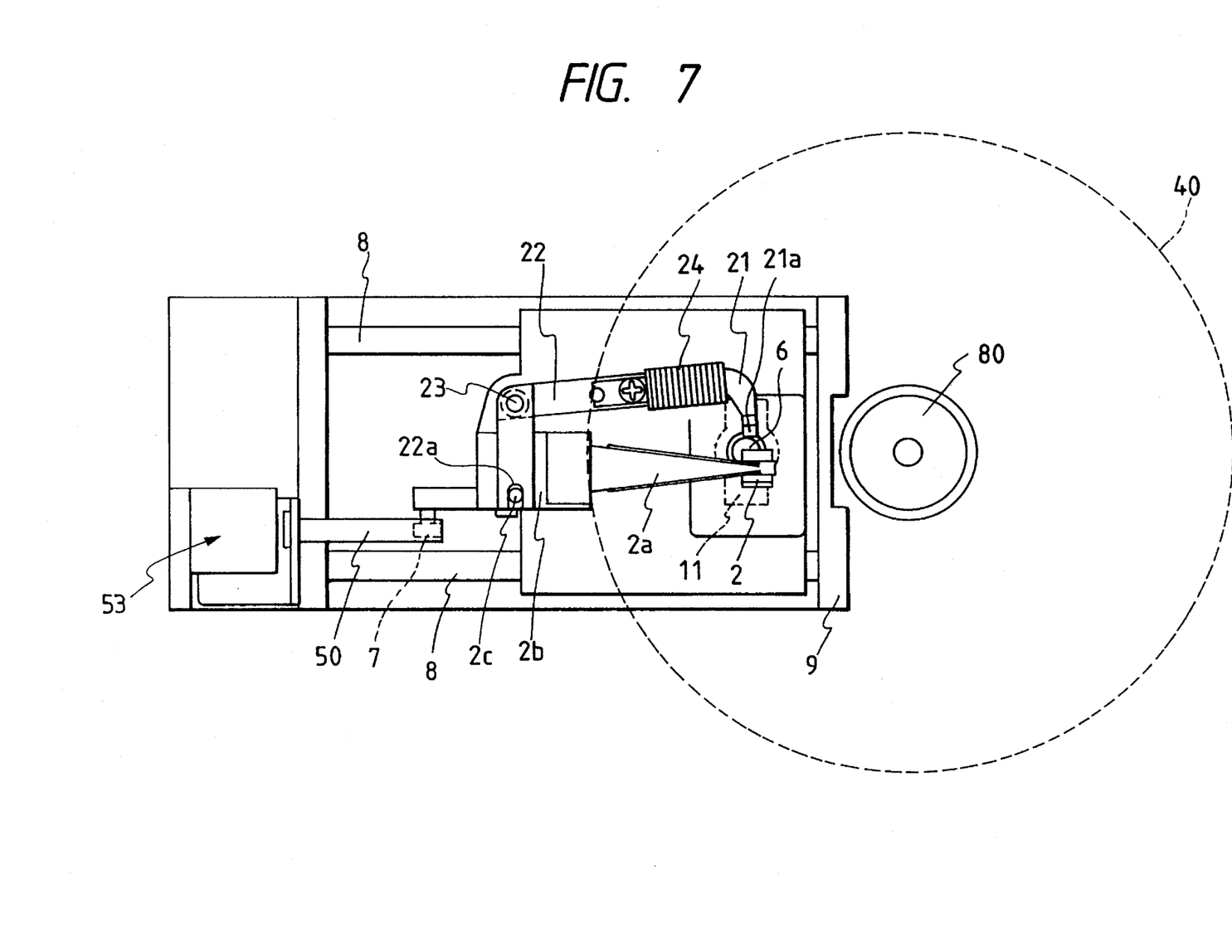
FIG. 7 is a plan view of the magnetooptical disk apparatus according to the embodiment shown in FIG. 6.
Figure 8:
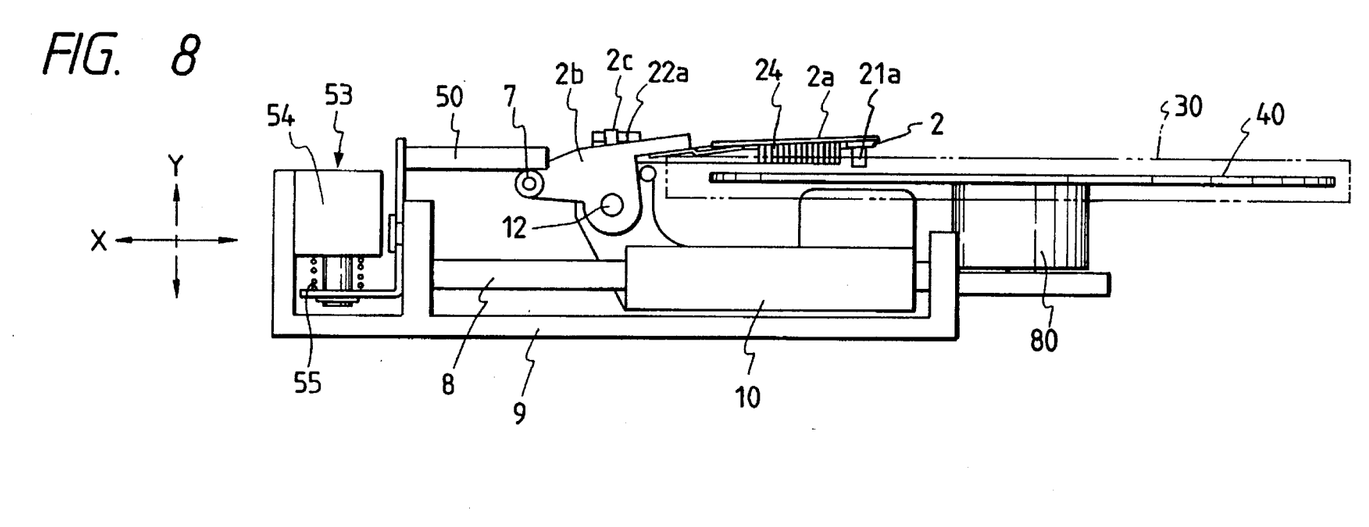
FIG. 8 is a side view of the magnetooptical disk apparatus according to the embodiment shown in FIG. 6.
Figure 9:
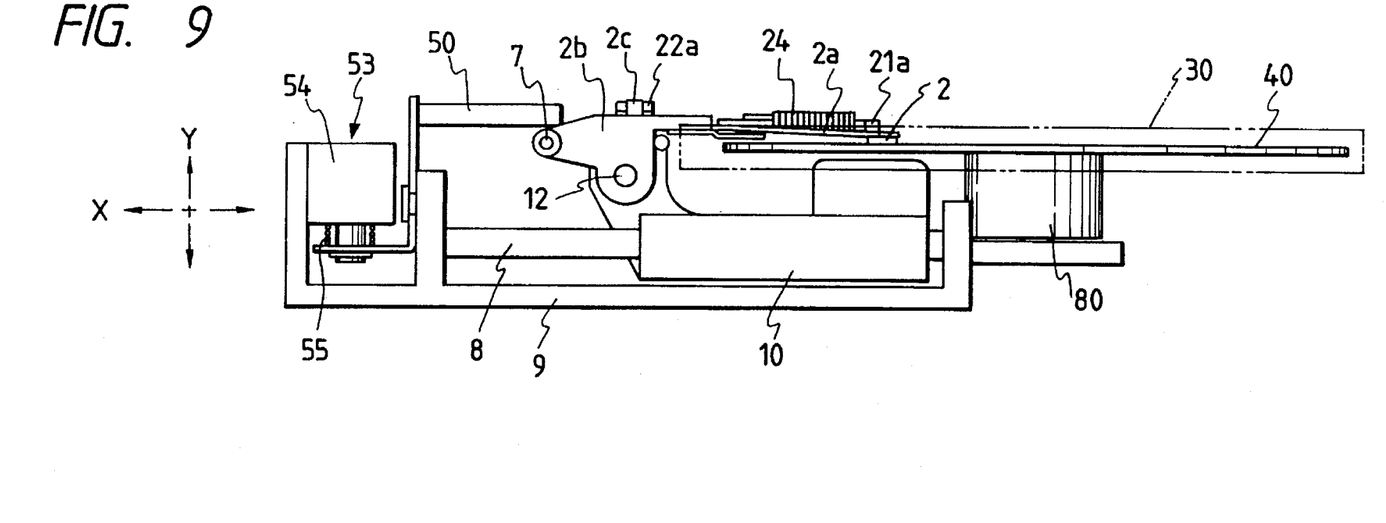
FIG. 9 is a side view of the magnetooptical disk apparatus according to the embodiment shown in FIG. 6.
Figure 10:
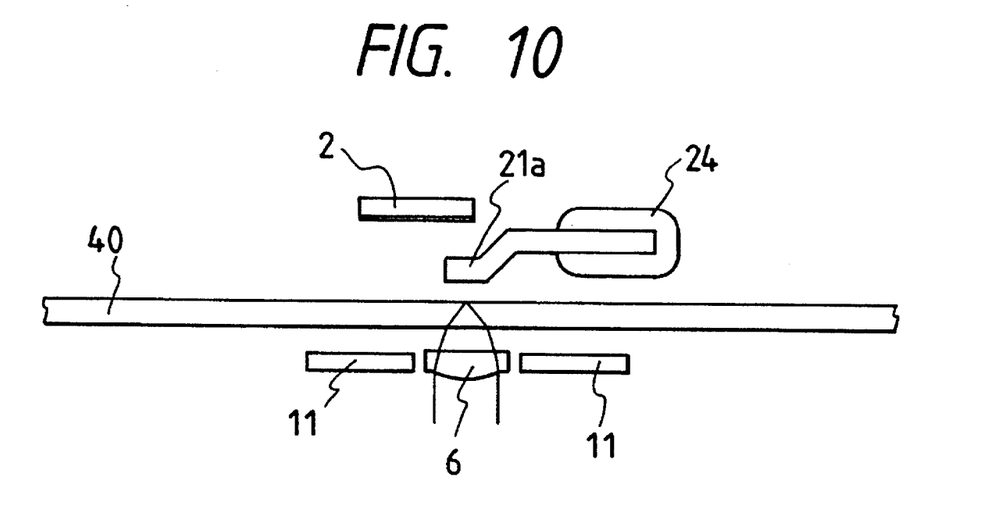
FIG. 10 is an enlarged sectional view of a portion, near a very small region where a beam spot is formed, of the magnetooptical disk apparatus according to the embodiment shown in FIG. 6.
Figure 11:
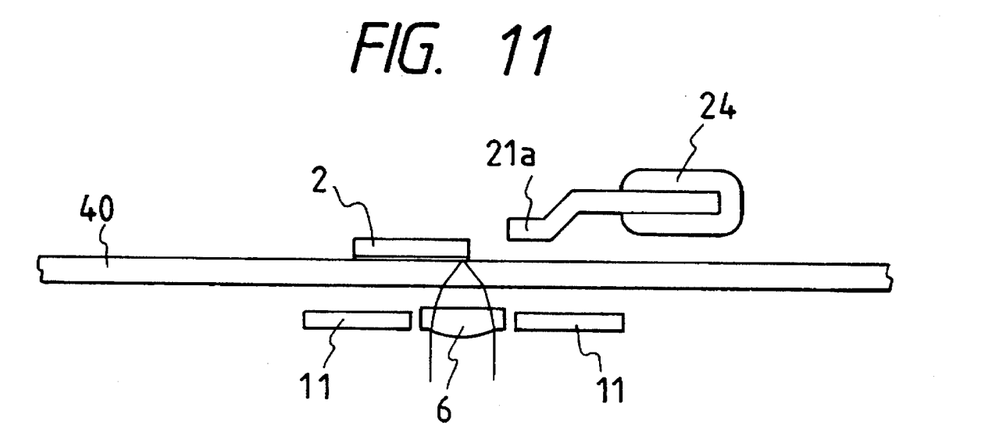
FIG. 11 is an enlarged sectional view of the portion, near the very small region where the beam spot is formed, of the magnetooptical disk apparatus according to the embodiment shown in FIG. 6.

FIGS. 6 and 7 are plan views of a magnetooptical disk apparatus according to an embodiment of the present invention. FIGS. 8 and 9 are side views of the magnetooptical disk apparatus, and FIGS. 10 and 11 are enlarged sectional views of a portion near a very small region where a beam spot is formed. FIGS. 6, 8, and 10 show a state wherein a disk cartridge is not loaded or an optical modulation disk is loaded. FIGS. 7, 9, and 11 show a state wherein a magnetic field modulation disk is loaded.

A bias magnetic field generation device A has substantially the same arrangement as that of the conventional device, except that an engaging pin 2c is newly arranged on the upper portion of a support member 2b. A bias magnetic field generation device B is constituted by a coil 24 and a core member 21, and a bias magnetic field is applied to one end portion 21a of the core member 21. The other end of the core member 21 is attached to one end portion of a pivot lever 22 consisting of a resin. The pivot lever 22 is pivotally supported by a support shaft 23 arranged on a carriage 10. A notch 22a is formed at the other end portion of the pivot levers 22, and is engaged with the engaging pin 2c.

When a disk cartridge is not loaded, a state shown in FIGS. 6, 8, and 10 is set. More specifically, since a solenoid 54 is not energized, an evacuating lever 50 is pulled down by the restoring force of a compression spring 55. Therefore, the evacuating lever 50 pushes down a roll-shaped engaging contact portion 7 provided at the rear end of the support member 2b, thereby evacuating a magnetic head. In this state, the end portion 21a of the core member 21 of the bias magnetic field generation device B is inserted between a floating slider 2 and an objective lens 6.

Even when a disk cartridge 30 is inserted, the solenoid 54 is not energized for a while. Information on a control track of a magnetooptical disk 40 is reproduced by an optical head to discriminate if the inserted disk is one for magnetic field modulation recording or optical modulation recording. If the inserted disk is an optical modulation recording disk, energization to the solenoid 54 is kept stopped, and the bias magnetic field generation device B is used. When the bias magnetic field generation device B is used, the end portion 21a of the core member 21 is inserted between the floating slider 2 and the disk 40, and is located at a position above and near a very small region, where a beam spot is formed, on the disk 40.

If the loaded disk 40 is a magnetic field modulation recording disk, energization to the solenoid 54 is started, and the floating slider 2 which mounts the magnetic head is brought down onto the disk. At this time, since the support member 2b is rotated clockwise in FIG. 8, the engaging pin 2c is moved toward the spindle motor side, and since the pivot lever 22 is rotated counterclockwise in FIG. 6 about the support shaft 23, the end portion 21a of the core member 21 is moved to be away from a position facing the objective lens 6, and can be evacuated to a position where it does not interfere with and is sufficiently away from the floating slider 2, which is brought down (the state shown in FIGS. 7, 9, and 11).

In the above-mentioned embodiment of the present invention, since the end portion 21a of the core member 21 is moved to a position above and near the very small region, where the beam spot is formed, on the disk, the bias magnetic field generation device B can be used in the best efficiency state indicated by a point B in FIG. 5. Therefore, the core member 21 and the coil 24 can be rendered compact and lightweight.

Another embodiment of the present invention will be described below.

Figure 12:
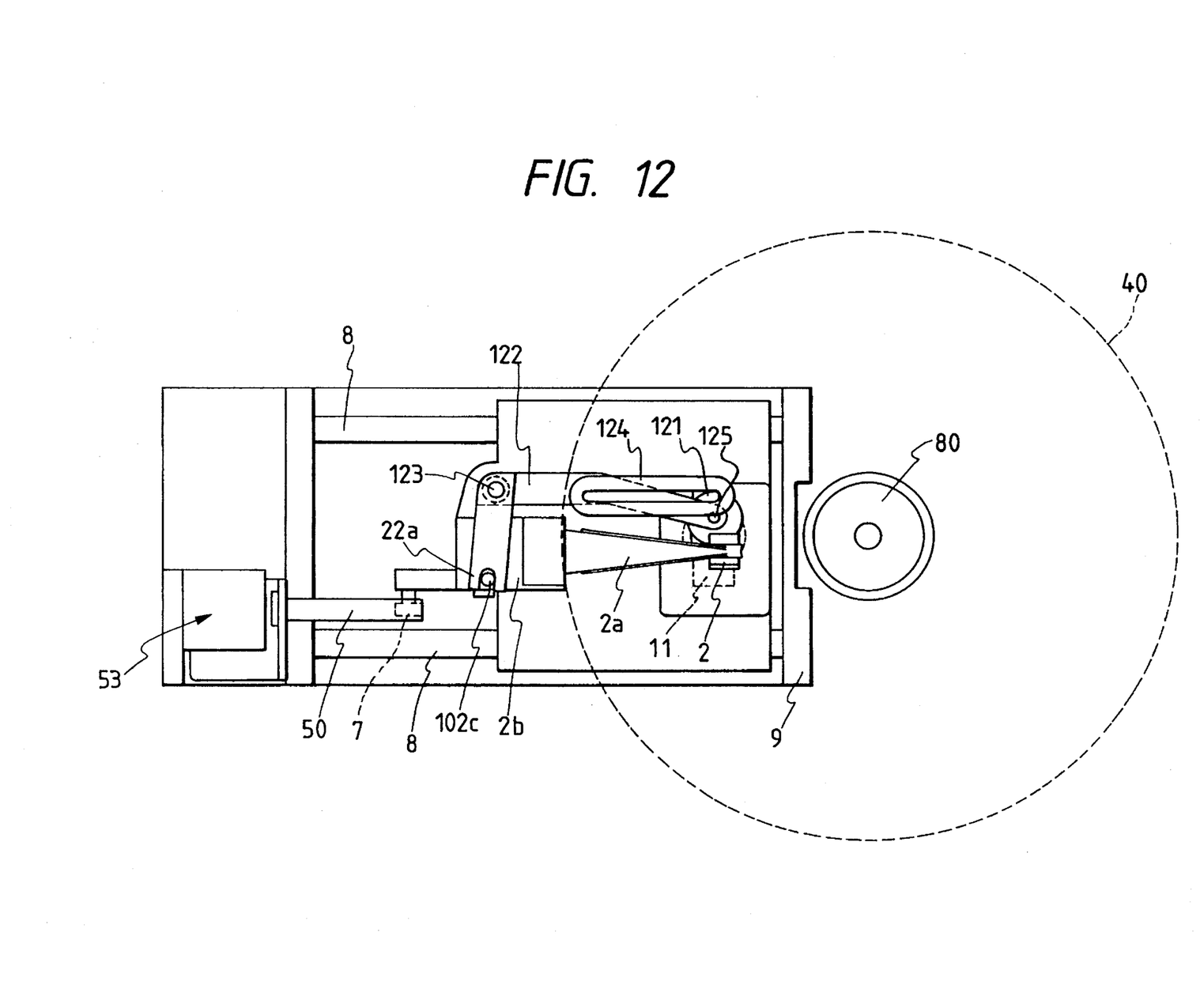
FIG. 12 is a plan view of a magnetooptical disk apparatus according to another embodiment of the present invention.
Figure 13:
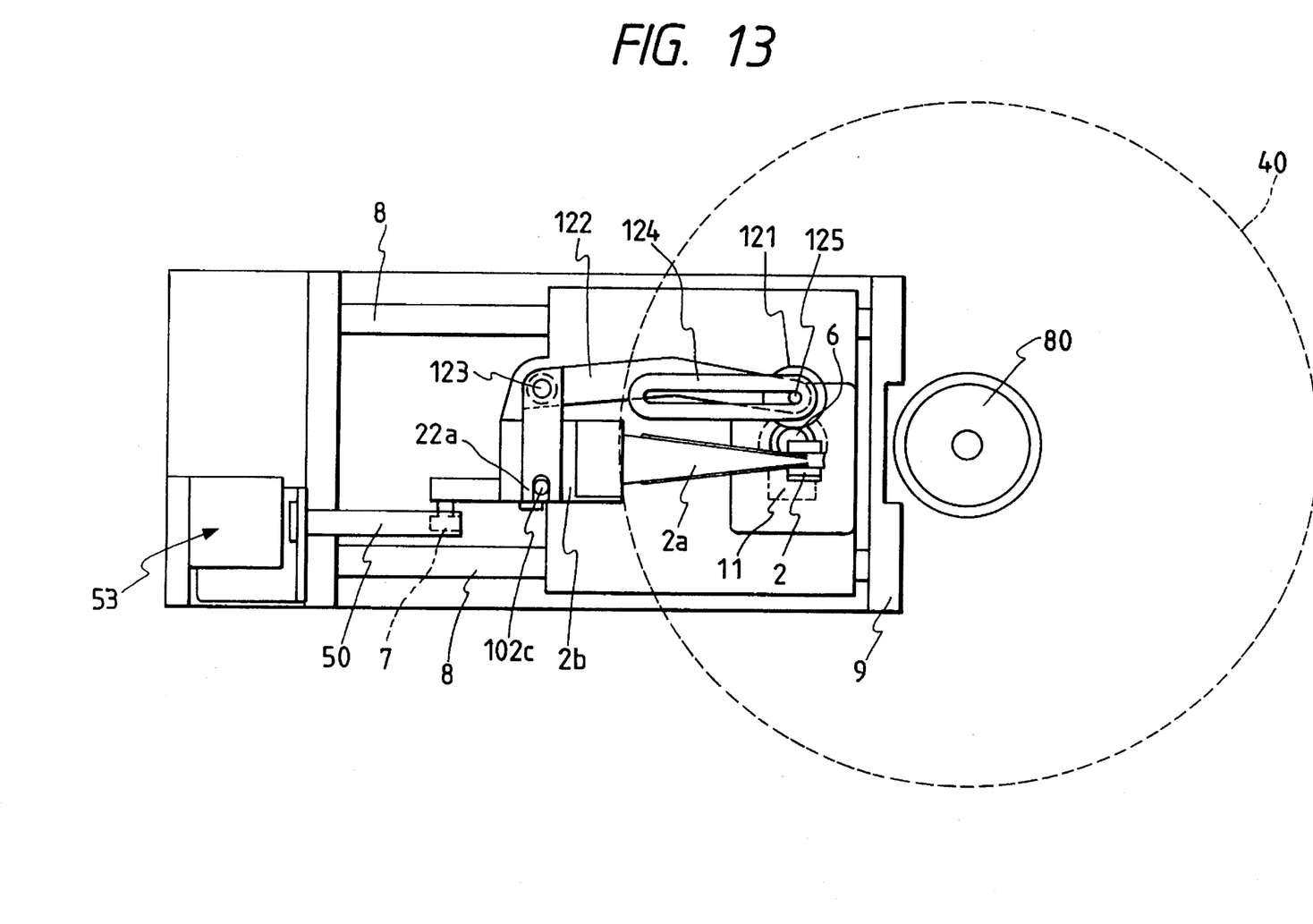
FIG. 13 is a plan view of the magnetooptical disk apparatus according to the embodiment shown in FIG. 12.
Figure 14:
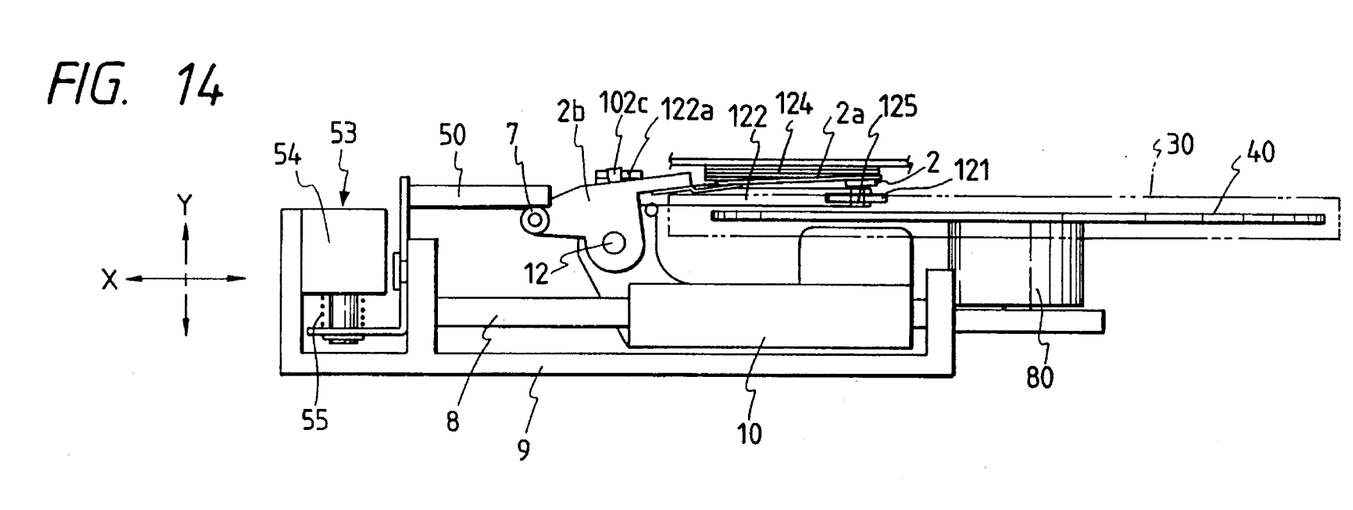
FIG. 14 is a side view of the magnetooptical disk apparatus according to the embodiment shown in FIG. 12.
Figure 15:
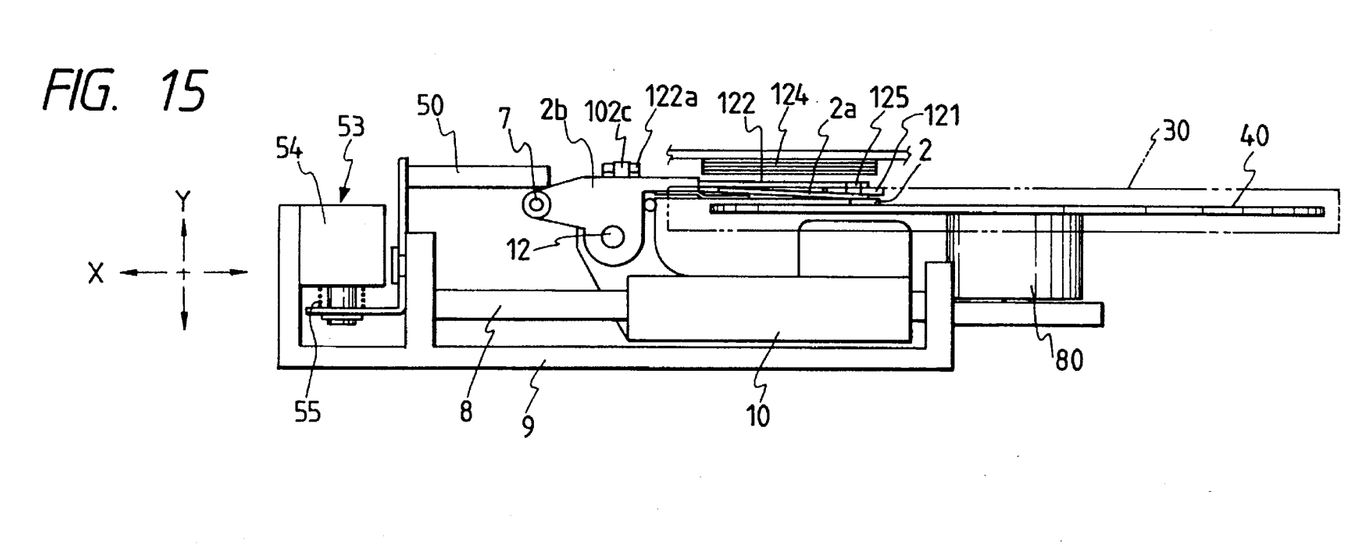
FIG. 15 is a side view of the magnetooptical disk apparatus according to the embodiment shown in FIG. 12.
Figure 16A:
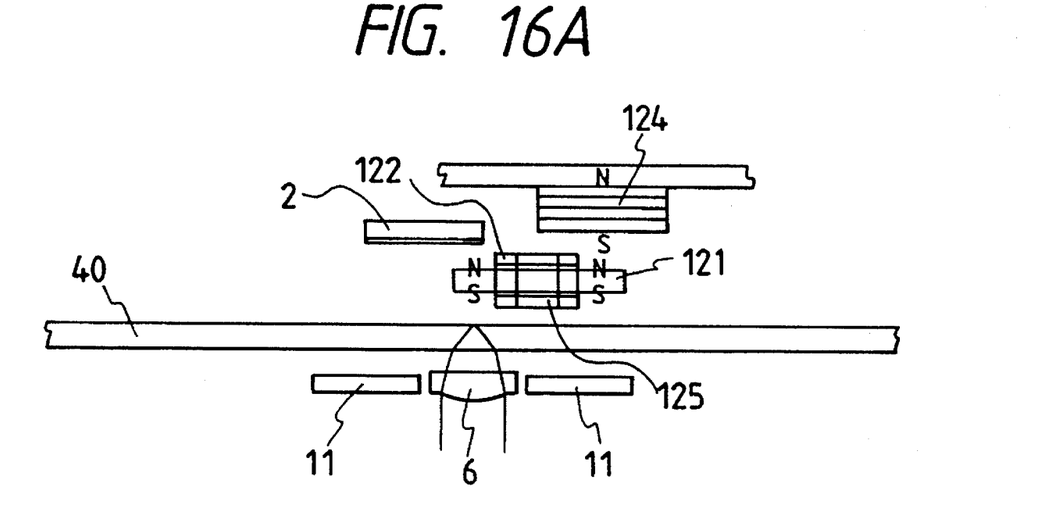
FIGS. 16A and 16B are enlarged sectional views of a portion, near a very small region where a beam spot is formed, of the magnetooptical disk apparatus according to the embodiment shown in FIG. 12.
Figure 16B:
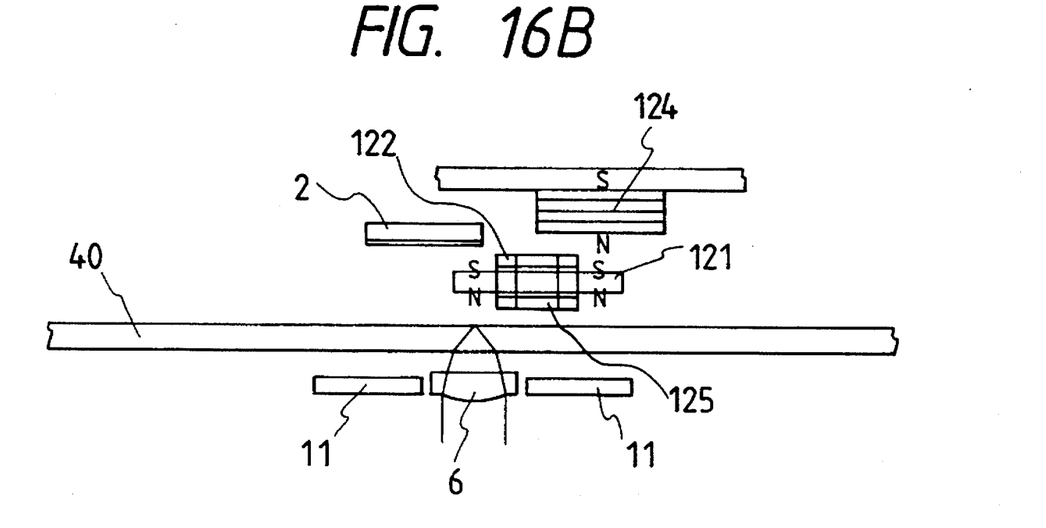
Figure 17:
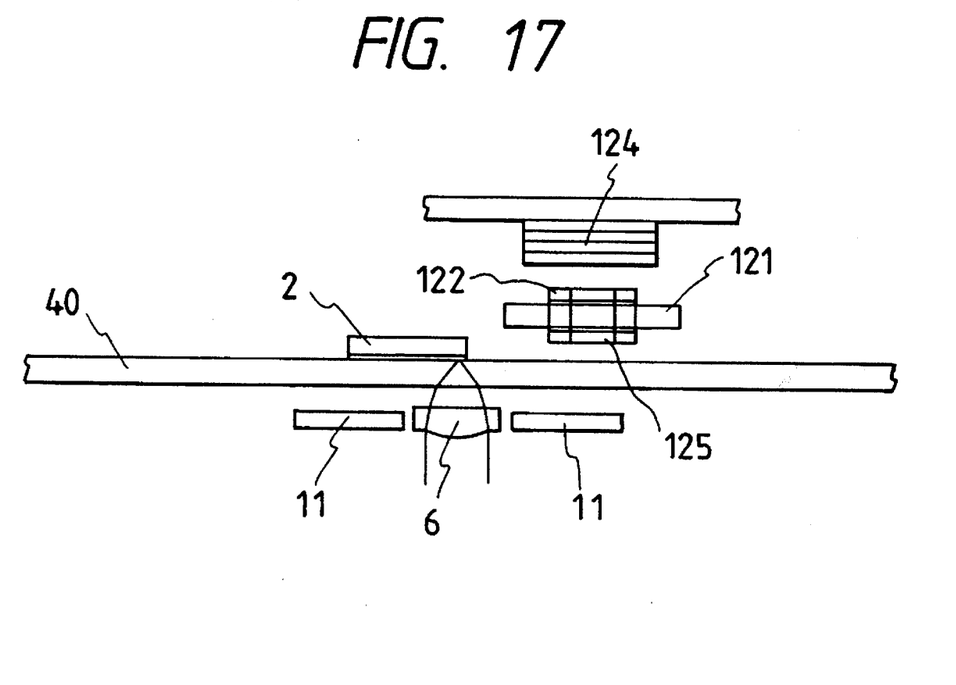
FIG. 17 is an enlarged sectional view of the portion, near the very small region where the beam spot is formed, of the magnetooptical disk apparatus according to the embodiment shown in FIG. 12.

FIGS. 12 and 13 are plan views of a magnetooptical disk apparatus according to another embodiment of the present invention. FIGS. 14 and 15 are side views of the magnetooptical disk apparatus, and FIGS. 16 and 17 are enlarged sectional views of a portion near a very small region where a beam spot is formed. FIGS. 12, 14, and 16 show a state wherein no disk cartridge is loaded or an optical modulation disk is loaded. FIGS. 13, 15, and 17 show a state wherein a magnetic field modulation disk is loaded.

Figure 18:
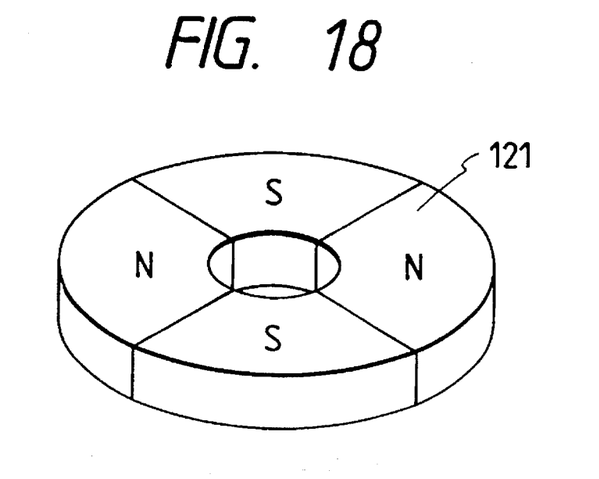
FIG. 18 is a perspective view of a permanent magnet of the magnetooptical disk apparatus according to the embodiment shown in FIG. 12.

A bias magnetic field generation device A has substantially the same arrangement as that of the conventional device, except that an engaging pin 102c is newly arranged on the upper portion of a support member 2b. A bias magnetic field generation device B is constituted by a disk-shaped permanent magnet 121, which is supported to be pivotal about a support shaft 125 provided at an end portion of an L-shaped pivot lever 122 consisting of a resin. The pivot lever 122 is pivotally supported by a support shaft 123 provided to a carriage 10. The permanent magnet 121 is divided into four portions in the circumferential direction, as shown in FIG. 18, and these portions are respectively magnetized in N, S, N, and S poles. A notch 122a is formed at the other end portion of the pivot lever 122, and is engaged with the engaging pin 102c. A ball bearing is arranged between the permanent magnet 121 and the support shaft 125 to allow smooth rotation of the permanent magnet 121. A polarity switching coil 124 is fixed to the apparatus main body side, e.g., to a cartridge holder, a top plate, a printed circuit board, or the like.

When a disk cartridge is not loaded, a state shown in FIGS. 12, 14, and 16 is set. More specifically, since a solenoid 54 is not energized, an evacuating lever 50 is pulled down by the restoring force of a compression spring 55. Therefore, the evacuating lever 50 pushes down a roll-shaped engaging contact portion 7 provided at the rear end of the support member 2b, thereby evacuating a magnetic head. In this state, the permanent magnet 121 of the bias magnetic field generation device B is inserted between a floating slider 2 and an objective lens 6.

Even when a disk cartridge 30 is inserted, the solenoid 54 is not energized for a while, and information on a control track of a magnetooptical disk 40 is reproduced by an optical head so as to discriminate if the inserted disk is one for magnetic field modulation recording or optical modulation recording. If the inserted disk is an optical modulation recording disk, energization to the solenoid 54 is kept stopped, and the bias magnetic field generation device B is used. When the bias magnetic field generation device B is used, the permanent magnet 121 is inserted between the floating slider 2 and the disk 40, and is located at a position above and near a very small region, where a beam spot is formed, on the disk 40. FIG. 16A shows a state in an information recording mode, and FIG. 16B shows a state in an information erasing mode. In the recording mode, since a current is supplied to the coil 124, so that a portion, on the permanent magnet side, of the coil 124 becomes an S pole, the N pole portion of the permanent magnet 121 is attracted to a position facing the coil 124 by rotating the permanent magnet 121 about the support shaft 125, as needed, and the S pole portion of the permanent magnet 121 faces the very small region, where the beam spot is formed, on the magnetooptical disk 40. In the erasing mode, conversely, since a current is supplied to the coil 124 so that the portion, on the permanent magnet side, of the coil 124 becomes an N pole, the permanent magnet 121 is rotated about the support shaft 125, and the N pole portion of the permanent magnet 121 faces the very small region, where the beam spot is formed, on the magnetooptical disk 40. Therefore, only by changing the direction of a current to be supplied to the coil 124, can the direction of the bias magnetic field on the disk be switched. The coil 124 is arranged to be located on the entire movable region of the permanent magnet 121.

On the other hand, if the loaded disk 40 is a magnetic field modulation recording disk, energization to the solenoid 54 is started to bring down the floating slider 2 which mounts the magnetic head onto the disk. At this time, since the support member 2b is rotated clockwise in FIG. 14, the engaging pin 102c is moved toward the spindle motor side, and since the pivot lever 122 is rotated counterclockwise in FIG. 12 about the support shaft 123, the permanent magnet 121 is moved to be away from a position facing the objective lens 6, and can be evacuated to a position where it does not interfere with and is sufficiently away from the floating slider 2, which is brought down (the state shown in FIGS. 13, 15, and 17). Therefore, in a magnetic field modulation recording mode, the magnetic head on the floating slider 2 is almost free from the influence of any magnetic field leaking from the permanent magnet 121.

Still another embodiment of the present invention will be described below.

Figure 19:
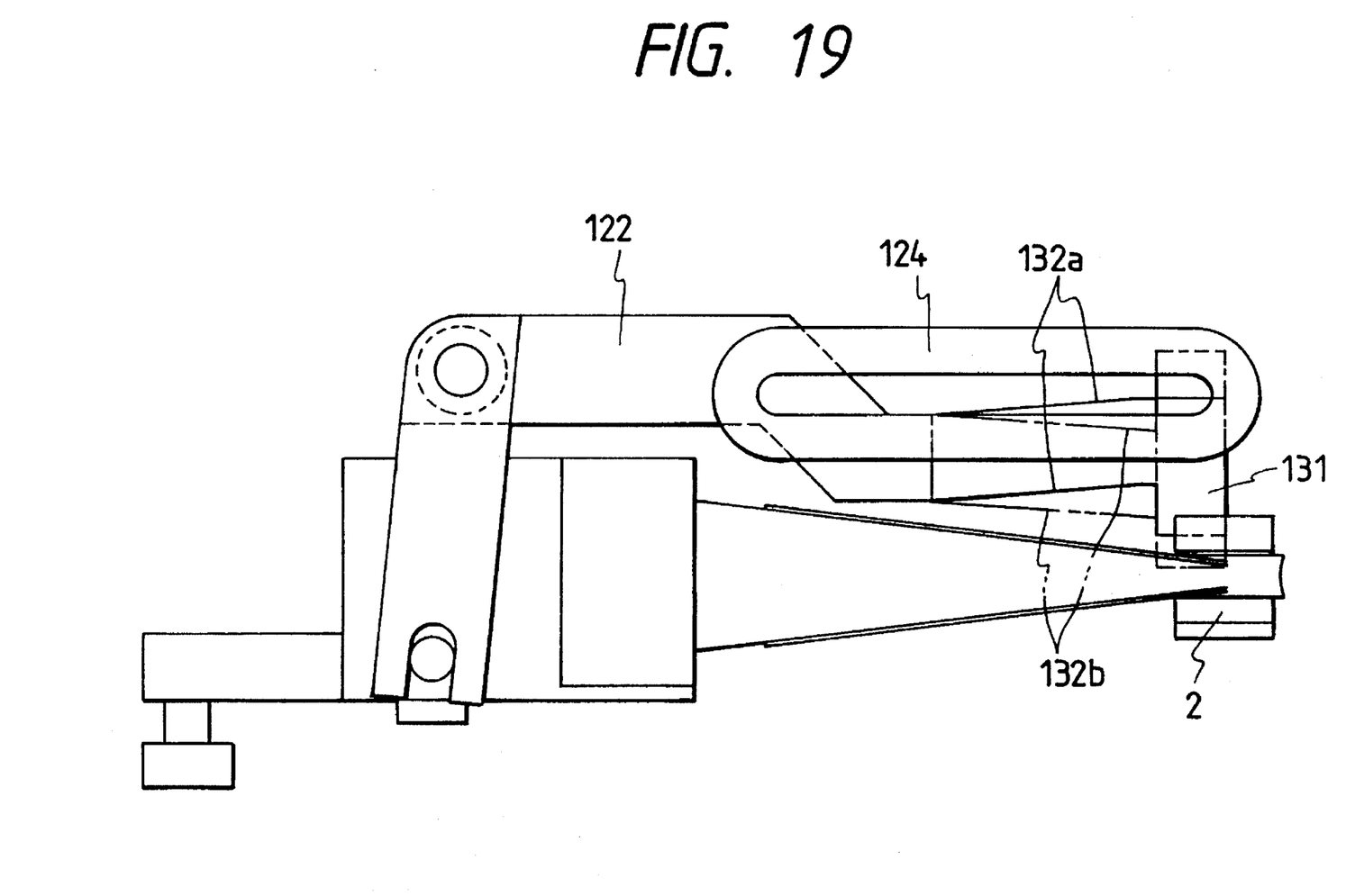
FIG. 19 is a partial plan view of a magnetooptical disk apparatus according to still another embodiment of the present invention.
Figure 20A:
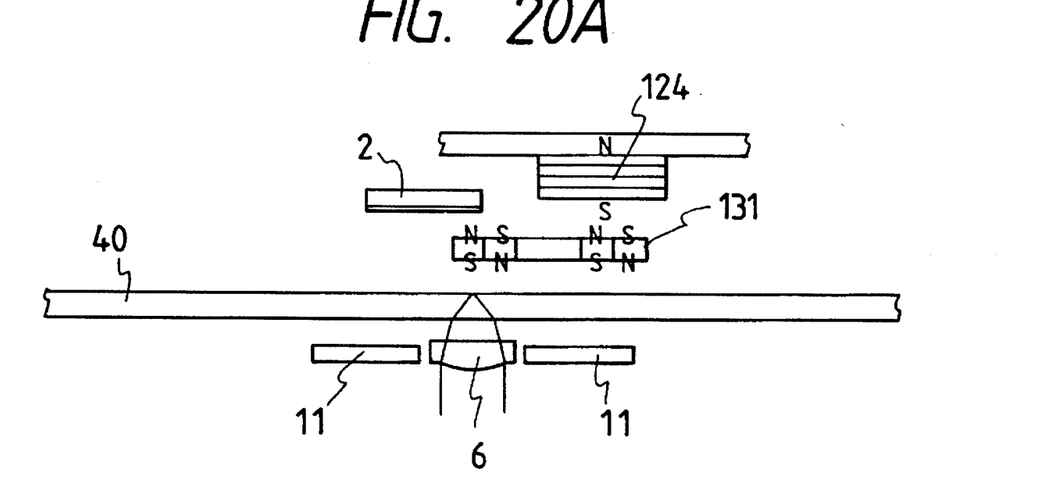
FIGS. 20A and 20B are enlarged sectional views of a portion, near a very small region where a beam spot is formed, of the magnetooptical disk apparatus according to the embodiment shown in FIG. 19.
Figure 20B:
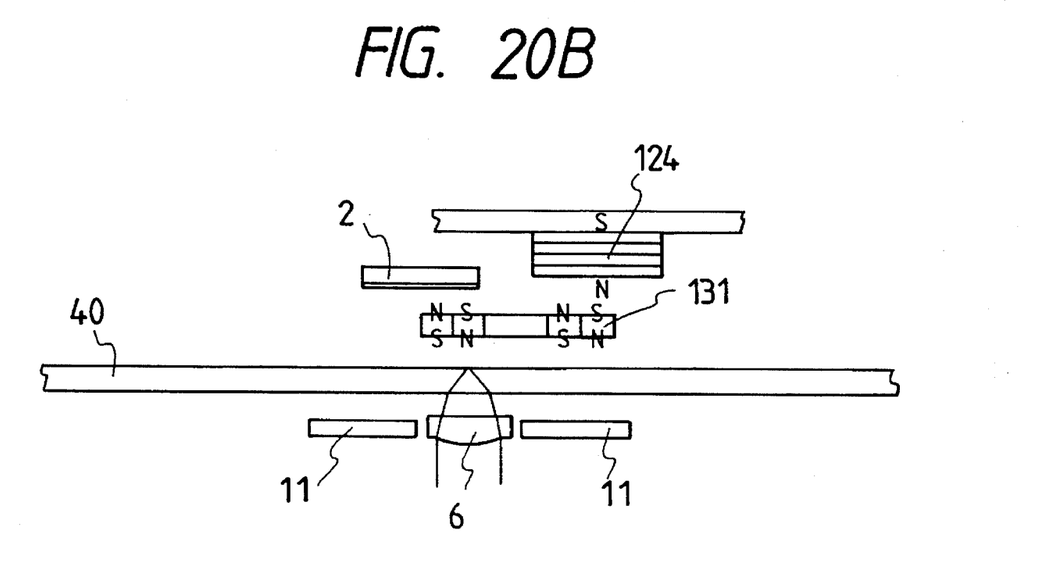

FIG. 19 is a partial plan view of a magnetooptical disk apparatus according to still another embodiment of the present invention, and FIGS. 20A and 20B are enlarged sectional views of a portion near a very small region where a beam spot is formed. FIG. 19 particularly shows a portion of bias magnetic field generation devices A and B. FIG. 20A shows a state in an information recording mode, and FIG. 20B shows a state in an information erasing mode.

A rectangular permanent magnet 131 is magnetized, as shown in FIGS. 20A and 20B. The permanent magnet 131 is coupled to one end of two substantially parallel leaf springs 132, and the other end of the parallel leaf springs 132 is supported by a pivot lever 122. Note that the parallel leaf springs 132 are denoted by reference numerals 132a and 132b indicating different deformation states in FIG. 19.

Since a switching operation between an optical modulation recording mode and a magnetic field modulation recording mode is the same as that in the above embodiment, a detailed description thereof will be omitted.

A switching operation of the polarities of the bias magnetic field in the optical modulation recording mode is attained by a coil 124 fixed to the apparatus main body side as in the above embodiment. In the recording mode, since a current is supplied to the coil 124, so that a portion, on the permanent magnet side, of the coil 124 becomes an S pole, the leaf springs 132 are elastically deformed, as indicated by 132a in FIG. 19, the N pole portion of the permanent magnet 131 is attracted to a position facing the coil 124, as shown in FIG. 20A, and the S pole portion of the permanent magnet 131 faces a very small region, where a beam spot is formed, on a magnetooptical disk 40. In the erasing mode, conversely, since a current is supplied to the coil 124, so that the portion, on the permanent magnet side, of the coil 124 becomes an N pole, the leaf springs 132 are elastically deformed, as indicated by 132b in FIG. 19, the S pole portion of the permanent magnet 131 is attracted to a position facing the coil 124, as shown in FIG. 20B, and the N pole portion of the permanent magnet 131 faces a very small region, where a beam spot is formed, on a magnetooptical disk 40. Therefore, only by changing the direction of a current to be supplied to the coil 124, can the direction of the bias magnetic field on the disk be switched. The coil 124 is arranged to be located on the entire movable region of the permanent magnet 131.

In the above-mentioned embodiment of the present invention, the permanent magnet is used in the bias magnetic field generation device B for applying a magnetic field for optical modulation recording in place of an electromagnet, and the coil as driving means for moving the permanent head so as to cause portions having different polarities of the permanent magnet to face the very small region, where the beam spot is formed, on the disk is provided to the apparatus main body in place of an optical head movable portion. For this reason, the bias magnetic field generation device B, which carries the optical head, can be remarkably rendered lightweight. Furthermore, since the permanent magnet is moved to a position above and near the very small region, where the beam spot is formed, on the disk, the bias magnetic field generation device B can be used in the best efficiency state. Therefore, from this point of view as well, the permanent magnet can be further rendered compact and lightweight.

What is claimed is:

1. A magnetooptical recording/reproducing apparatus comprising:

an optical head for forming a beam spot on a recording medium;

a floating type magnetic head for applying a bias magnetic field to the recording medium to effect magnetic field modulation recording;

a pivotable supporting member for supporting said magnetic head;

retreating means for causing said supporting member to pivot so as to retreat said magnetic head away from the recording medium in a direction substantially perpendicular to a surface of the recording medium;

magnetic field applying means, movable along the surface of the recording medium, for applying a bias magnetic field to the recording medium to effect light modulation recording; and coupling means for mechanically coupling said supporting member and said magnetic field applying means, said coupling means causing said magnetic field applying means to move in association with movement of said supporting member, wherein said coupling means moves said magnetic field applying means to a position of the beam spot on the recording medium when said retreating means retreats said magnetic head away from the recording medium, and said coupling means retreats said magnetic field applying means away from the position of the beam spot on the recording medium when said magnetic head is not retreated away from the recording medium by said retreating means.

2. An apparatus according to claim 1, further comprising a carriage on which said optical head, said magnetic field applying means and said coupling means are mounted.

3. An apparatus according to claim 1, wherein said magnetic field applying means comprises an electromagnet.

4. An apparatus according to claim 1, wherein said magnetic field applying means comprises a permanent magnet.

* * * * *

UNITED STATES PATENT AND TRADEMARK OFFICE
CERTIFICATE OF CORRECTION

PATENT NO. : 5,557,588
DATED : September 17, 1996
INVENTOR(S) : MAKOTO SHIHO

It is certified that error appears in the above-indentified patent and that said Letters Patent is hereby corrected as shown below:

ON THE COVER PAGE:

In the "ABSTRACT" item [57]

Line 7, "bias" should read --a bias--.

COLUMN 4

Line 61, "levers" should read --lever--.

COLUMN 6

Line 29, "the-coil" should read --the coil--.

Signed and Sealed this

Eleventh Day of February, 1997

Attest:

BRUCE LEHMAN

*Attesting Officer*　　　*Commissioner of Patents and Trademarks*